United States Patent
Geiger (10) Patent No.: US 8,342,023 B2
(45) Date of Patent: Jan. 1, 2013

(54) CORIOLIS GYRO

(75) Inventor: Wolfram Geiger, Freiburg (DE)

(73) Assignee: Northrop Grumman LITEF GmbH, Freiburg (DE)

( * ) Notice: Subject to any disclaimer, the term of this patent is extended or adjusted under 35 U.S.C. 154(b) by 410 days.

(21) Appl. No.: 12/451,963

(22) PCT Filed: Mar. 28, 2008

(86) PCT No.: PCT/EP2008/002502
§ 371 (c)(1),
(2), (4) Date: Dec. 9, 2009

(87) PCT Pub. No.: WO2009/003541
PCT Pub. Date: Jan. 8, 2009

(65) Prior Publication Data
US 2010/0116050 A1    May 13, 2010

(30) Foreign Application Priority Data

Jun. 29, 2007 (DE) .......................... 10 2007 030 119

(51) Int. Cl.
*G01C 19/56* (2006.01)
(52) U.S. Cl. .................................. 73/504.12; 73/504.04
(58) Field of Classification Search ............... 73/504.12, 73/504.14, 504.04, 504.02, 504.16
See application file for complete search history.

(56) References Cited

U.S. PATENT DOCUMENTS

| | | | | |
|---|---|---|---|---|
| 5,728,936 A * | 3/1998 | Lutz | ............................ | 73/504.14 |
| 5,869,760 A * | 2/1999 | Geen | ............................ | 73/504.12 |
| 6,122,961 A * | 9/2000 | Geen et al. | ................. | 73/504.12 |
| 6,742,390 B2 * | 6/2004 | Mochida et al. | ........... | 73/504.14 |
| 6,848,304 B2 * | 2/2005 | Geen | ........................... | 73/504.04 |
| 7,284,429 B2 * | 10/2007 | Chaumet et al. | .......... | 73/504.12 |
| 7,316,161 B2 * | 1/2008 | Willig et al. | ............... | 73/504.12 |
| 7,340,954 B2 * | 3/2008 | Handrich | ................... | 73/504.04 |
| 7,421,897 B2 * | 9/2008 | Geen et al. | ................. | 73/504.12 |
| 7,461,552 B2 * | 12/2008 | Acar | ........................... | 73/504.04 |
| 7,513,155 B2 * | 4/2009 | Jeong et al. | ................ | 73/504.02 |
| 2003/0154788 A1 | 8/2003 | Willig et al. | | |
| 2004/0206176 A1 | 10/2004 | Willig et al. | | |
| 2004/0211257 A1 | 10/2004 | Green | | |

(Continued)

FOREIGN PATENT DOCUMENTS

DE        101 08 197 A1      9/2002

(Continued)

OTHER PUBLICATIONS

Office action dated Jan. 19, 2011 in Australian patent application 2008271664.

*Primary Examiner* — Helen C. Kwok
(74) *Attorney, Agent, or Firm* — Elliott N. Kramsky (57) ABSTRACT

A Coriolis gyro having an arrangement which comprises a substrate, at least two individual structures and spring elements. The spring elements couple the individual structures to the substrate and to one another. Force transmitters and taps are provided. The arrangement has at least one excitation mode which can be excited by the force transmitters and at least one detection mode which can be measured by the taps. The excitation mode and the detection mode are closed, as a result of which no disturbance excitations of the excitation mode and of the detection mode can be caused by linear accelerations and/or vibrations if there is no need to take account of manufacturing tolerances.

12 Claims, 10 Drawing Sheets

U.S. PATENT DOCUMENTS

2005/0050954 A1 3/2005 Chaumet et al.
2007/0234803 A1 10/2007 Gomez et al.

FOREIGN PATENT DOCUMENTS

| | | |
|---|---|---|
| EP | 1515119 | 3/2005 |
| EP | 1793202 | 6/2007 |
| JP | 9-119942 A | 5/1997 |
| JP | 2001-27529 A | 1/2001 |
| JP | 2003-247829 A | 9/2003 |
| JP | 2004-163376 A | 6/2004 |
| JP | 2007-155489 A | 6/2007 |
| WO | 9534798 | 12/1995 |
| WO | 02066929 | 8/2002 |
| WO | 03058167 | 7/2003 |
| WO | WO-2006/113162 A1 | 10/2006 |

\* cited by examiner

CORIOLIS GYRO

BACKGROUND

1. Field of the Invention

The present invention relates to Coriolis gyros.

2. Description of the Prior Art

Coriolis gyros (coriolis vibrating gyroscopes) fall within two classes, each corresponding to the oscillation mode utilized. The two classes are: (1) shape and bending oscillations (e.g. wine glass (HRG: "Hemispherical Resonator Gyroscope"), ring, bar); and (2) spring and mass system (e.g. Lin-Rot, Rot-Rot, Lin-Lin, wherein Lin-Rot means that the excitation mode contains linear movements ("Lin") and the detection mode contains rotary movements ("Rot"). Rot-Rot and Lin-Lin are defined correspondingly.)

Such classes of Coriolis gyros have specific advantages and disadvantages with respect to vibration and acceleration sensitivity. The relative advantages and disadvantages of the two classes are discussed below.

1. Shape and Bending Oscillations

Advantages: Externally closed useful modes (excitation and detection mode) are typical, i.e. such modes do not transmit forces and moments to the outside. They are therefore excited by neither linear accelerations nor vibrations with linear and/or rotary components. ("External" relates to the "surrounding area" of the substrate. Forces or moments can act locally on the substrate itself as a result of movement of mass elements or individual structures, but these cancel one another out overall). The substrate is mounted on a housing or a ceramic (a "mount"), e.g. by adhesive bonding or soldering. No forces or moments are transmitted to the mount by closed modes. However, this is true only if no manufacturing tolerances have to be taken into account.

Disadvantages: Most known structures require soft suspension (e. g. ring, bar; an exception is the so-called HRG (Hemispherical Resonator Gyroscope), which requires complex manufacturing processes due to its "true three-dimensional" form). Such structures are deflected relatively significantly when accelerations and vibration occur, leading to errors in many force transmitters (e.g. electrostatic force transmitters) and taps (e.g. capacitive taps). Also, quadrature compensation, i.e. "balancing-out" of the structure by an actuating element, is virtually impossible, since the required forces are too great.

2. Spring and Mass Systems

Advantages: Two articles, one by P. Greiff, B. Boxenhorn, T. King and L. Niles entitled "Silicon Monolithic Micromechanical Gyroscope" (Tech. Digest, 6th Int. Conf. on Solid-State Sensors and Actuators (Transducers '91), San Francisco, Calif., USA, June 1991, pp. 966-968) and the other by J. Bernstein, S. Cho, A. T. King, A. Kourepins, P. Maciel and M. Weinberg entitled "A Micromachined Comb-Drive Tuning Fork Rate Gyroscope" (Proc. IEEE Micro Electromechanical Systems Workshop (MEMS 93), Fort Lauderdale, Fla., USA, February 1993, pp. 143-148 or DE 196 41 284 C1) disclose structures in which the resonant frequencies of the useful modes may be considerably lower than that of the other modes that can be excited by accelerations and/or vibrations, and produce a significant error signal. Modes that cause a significant error signal are, in particular, modes that influence the measurement signal of the detection movement. Modes that influence measurement of the excitation movement are typically less damaging.

Disadvantages: Vibration and, frequently, linear accelerations can excite one or both useful modes and therefore cause error signals.

Rotation rate sensors each having two pairs of individual sensors which oscillate linearly in antiphase and with a linear detection mode are described in EP 1515119 A1. WO 95/34798 describes a Coriolis gyro having two seismic masses and a detection mode which is based on a rotary oscillation of the two seismic masses.

SUMMARY AND OBJECTS OF THE INVENTION

It is therefore the object of the invention to provide a rotation rate sensor based on spring and mass systems, having reduced sensitivity to accelerations and vibration.

The present invention addresses the preceding and other objects by providing a Coriolis gyro. Such gyro has a substrate, at least two individual structures and spring elements. The spring elements couple the individual structures to the substrate and to one another.

The gyro also has force transmitters and taps. Such arrangement has an excitation mode that can be excited by the force transmitters and a detection mode that can be measured by the taps.

The detection mode is excited, in the excited excitation mode, by a Coriolis force when the Coriolis gyro is rotated about a sensitive axis.

The foregoing and other features and objects of the invention will become further apparent from the detailed description that follows. Such written description is accompanied by a set of drawing figures in which numerals, corresponding to numerals of the written description, point to the features of the invention. Like numerals refer to like features of the invention throughout both the written description and the drawing figures. (In some cases, identical parts are not provided with identical reference symbols in the figures for purposes of clarity. However, due to the described symmetries and the identical illustrations, one skilled in the art will readily comprehend which parts of the figures are associated with which reference symbols.)

BRIEF DESCRIPTION OF THE DRAWINGS

In FIGS. 1 to 4, all the components which are shown in light gray represent moving "mass elements" as individual structures which, to a first approximation, can be considered to be infinitely stiff. Areas shown in dark gray (black) largely cannot move relative to the substrate.

DETAILED DESCRIPTION OF THE PREFERRED EMBODIMENT

Figure 1:
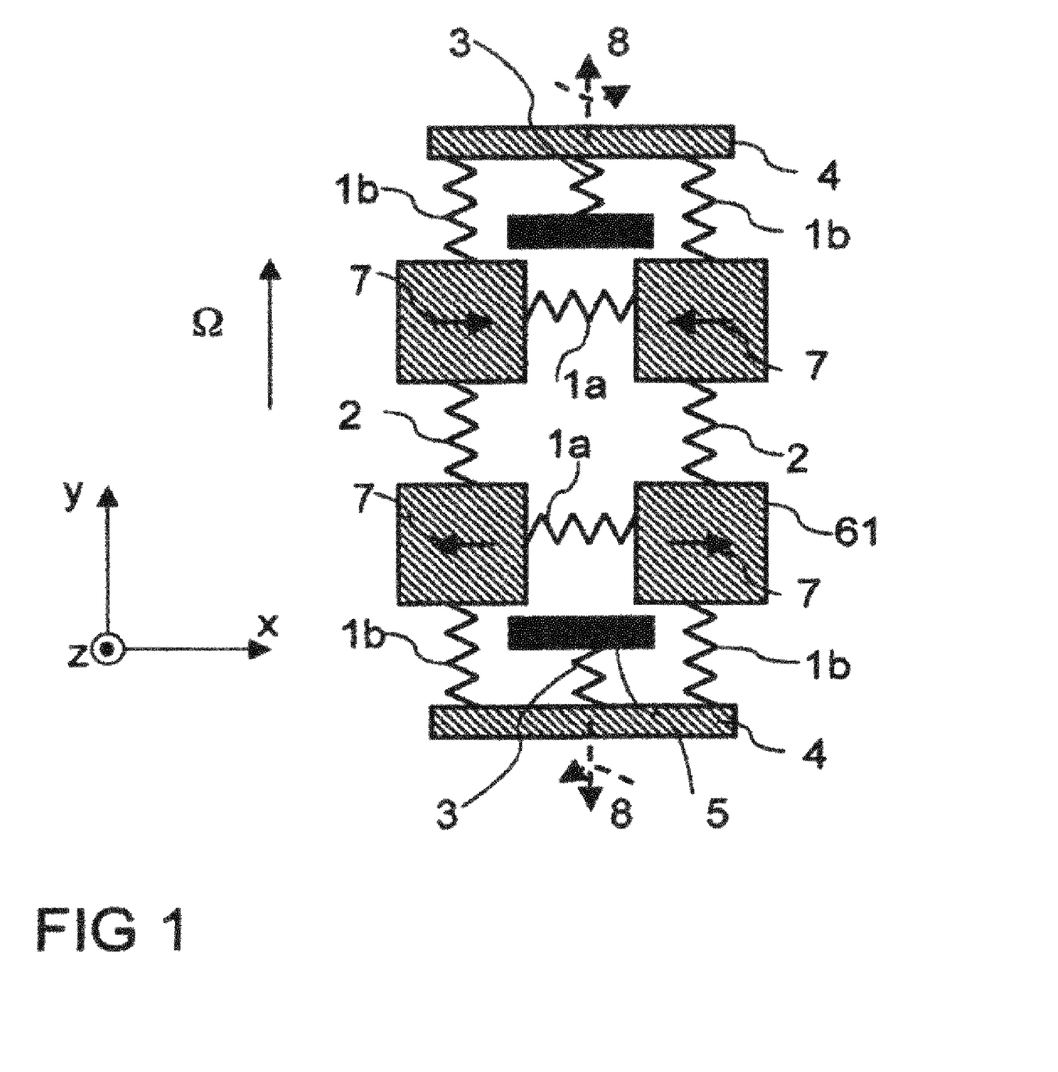
FIG. 1 is a mechanical schematic diagram of a first embodiment of a closed spring and mass system Coriolis gyro with linear oscillations serving as the excitation mode and rotary oscillations serving as the detection mode.

FIG. 1 is a mechanical schematic diagram of a Coriolis gyro based on a spring and mass system, in a first embodiment, having four first mass elements 61 coupled via first x coupling spring elements 1a and coupling spring elements 2 to one another. The described elements are coupled via second x coupling spring elements 1b, connecting elements 4 and first substrate spring elements 3 to a substrate 5 (shown in FIG. 1 by means of an anchor). Two coupled out-of-phase linear oscillations of the mass elements 61, again out-of-phase with respect to one another, serve as the excitation mode 7. When the Coriolis gyro is rotated about a sensitive axis Ω, a detection mode 8 is excited (represented as two coupled out-of-phase rotary oscillations about a y axis parallel to the sensitive axis Ω and at right angles to the x direction (Lin-Rot)). The x coupling spring elements 1a, 1b are soft in the x direction, and otherwise stiff. The coupling spring elements 2 may be isotropically soft (i.e. soft for all loads), the first substrate spring elements 3 are soft in the case of rotation about the y axis, but are otherwise stiff. The useful modes (i.e. the excitation modes 7 and detection modes 8) are closed in this Coriolis gyro. The excitation and detection modes can also be interchanged, the two described coupled out-of-phase rotary oscillations about the y axis can be used as the excitation mode, and the two coupled out-of-phase linear oscillations can be used as the detection mode.

Figure 2A:
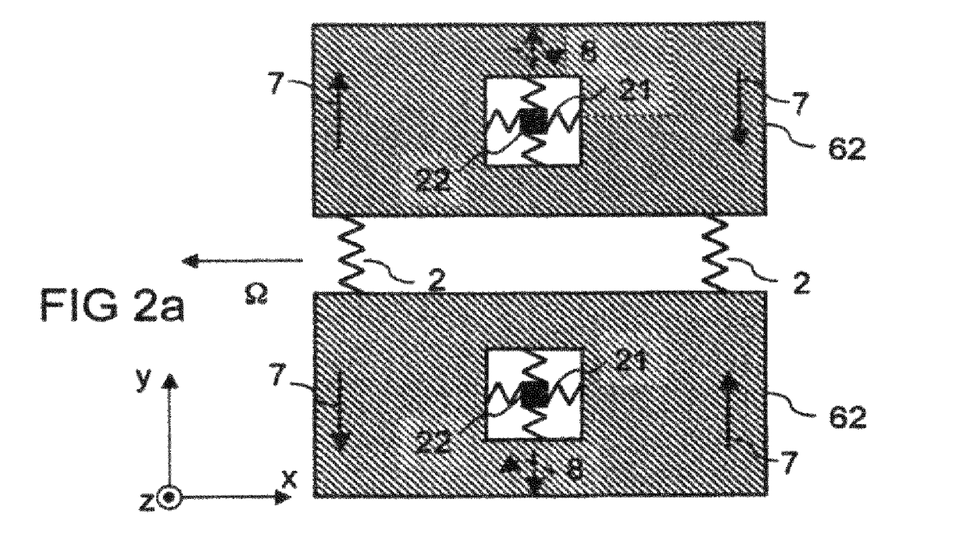
FIGS. 2a and 2b are schematic diagrams of first and second variants, respectively, of a closed spring and mass system Coriolis gyro with rotary oscillations as the excitation mode and as the detection mode.

FIG. 2a is a schematic diagram of a Coriolis gyro based on a spring and mass system Two second mass elements 62 are coupled by coupling spring elements 2 to one another and are coupled via second substrate spring elements 21 to a substrate 5 (illustrated by an anchor 22). Two coupled out-of-phase rotary oscillations of the mass elements 62 about the substrate anchor 22, about a z direction, serve as the excitation mode 7. During rotation of the Coriolis gyro about its sensitive axis Ω, two coupled out-of-phase rotary oscillations about a y axis are excited (Rot-Rot) as the detection mode, and are at right angles to the sensitive axis Ω and to the rotation axis z of the excitation mode 7. The second substrate spring elements 21 are soft during rotation about the z and y axes, but are otherwise as stiff as possible. The coupling spring elements 2 may be isotropically soft (i.e. soft for all loads). In the case of this Coriolis gyro the useful modes (i.e. the excitation modes 7 and detection modes 8) are closed.

Figure 2B:
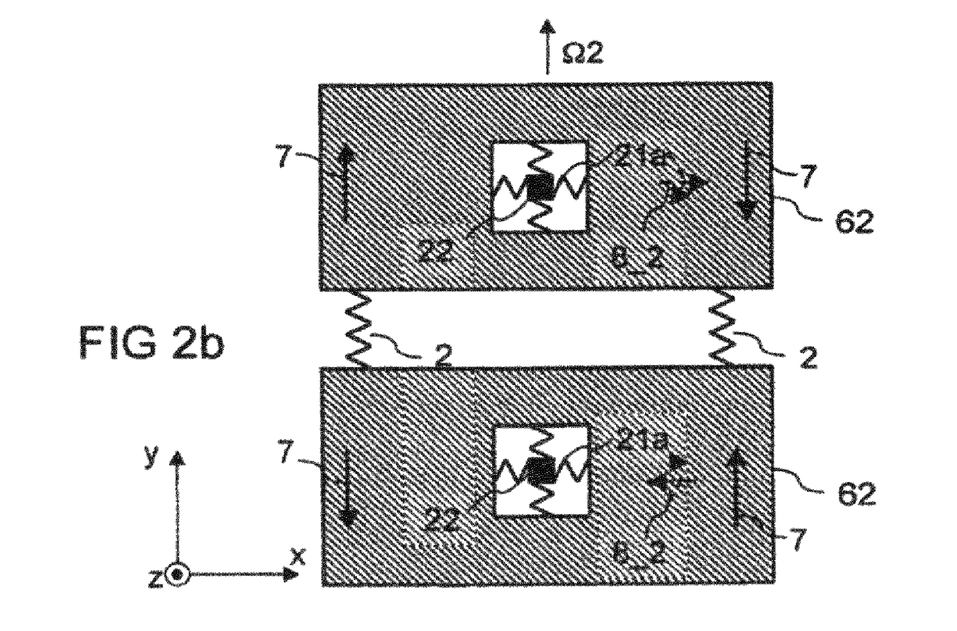

FIG. 2b is a schematic diagram of the Coriolis gyro of FIG. 2a, with the same excitation mode 7, (i.e. two coupled out-of-phase rotary oscillations of the mass elements 62 about the substrate anchor 22, about the z direction). The second substrate spring elements 21a are soft during rotation about the z, x and y axes, but are otherwise as stiff as possible. The illustrated Coriolis gyro has a second closed detection mode 8_2, which is excited during rotation of the Coriolis gyro about a second sensitive axis Ω2, and comprises two coupled out-of-phase rotary oscillations about an x axis. The illustrated Coriolis gyro can therefore also be referred to as a "two-axis" gyro, and has three closed modes, which can be used as an excitation mode and, depending on the sensitive axis, a detection mode.

Figure 3:
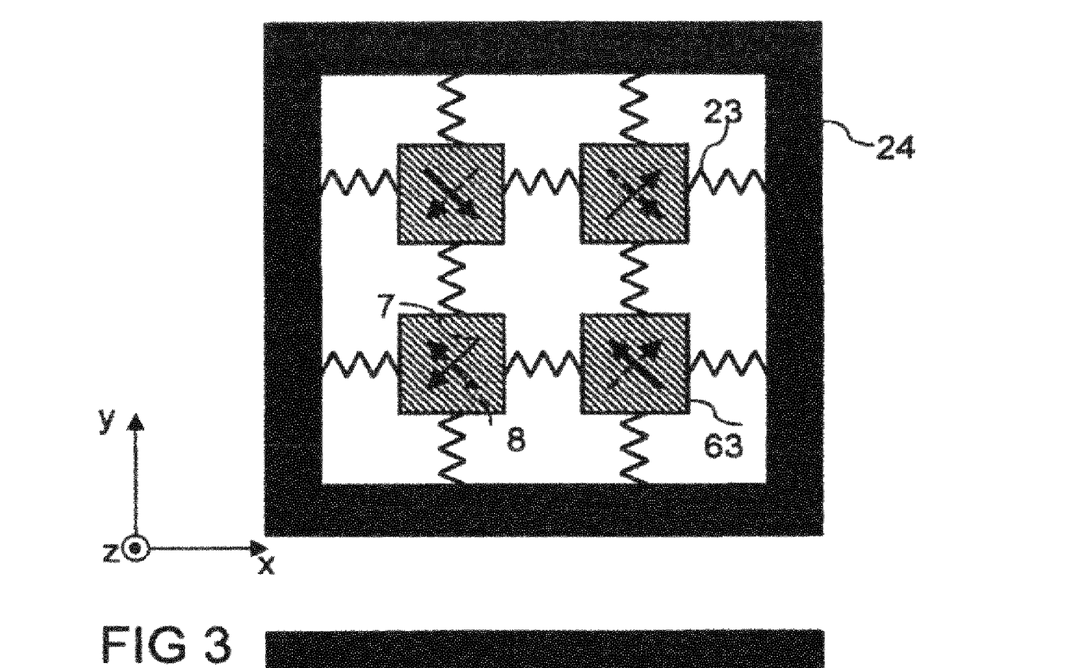
FIG. 3 is a schematic diagram of a third embodiment of a closed spring and mass system Coriolis gyro with linear oscillations as the excitation mode and as the detection mode.

FIG. 3 is a schematic diagram of a third embodiment of a Coriolis gyro based on a spring and mass system. Four third mass elements 63 are coupled via xy coupling spring elements 23 to one another and to a substrate 5 (illustrated by an anchor 24). Linear oscillations of the mass elements 63 at 45° to the x and y directions are used as the excitation mode 7. In this case, two obliquely opposed third mass elements 63 each move towards one another when the respective other two opposed third mass elements 63 move away from one another. During rotation of the Coriolis gyro about the sensitive axis Ω (at right angles to the x and y directions and therefore parallel to the z direction), a linear oscillation is excited as the detection mode, and is shifted with respect to the excitation mode (Lin-Lin). In this case, the third mass elements 63, which are adjacent in the x direction, move towards one another in the x direction when third mass elements 63, adjacent in the y direction, are moving away from one another in the y direction. The third mass elements 63, which are adjacent in the x direction, move away from one another in the x direction when the third mass elements 63, which are adjacent in the y direction, are moving towards one another in the y direction. The xy coupling spring elements 23 are soft in the x direction and in the y direction, but are otherwise stiff. With this Coriolis gyro as well, the useful modes (i.e. the excitation modes 7 and detection modes 8) are closed.

Figure 4:
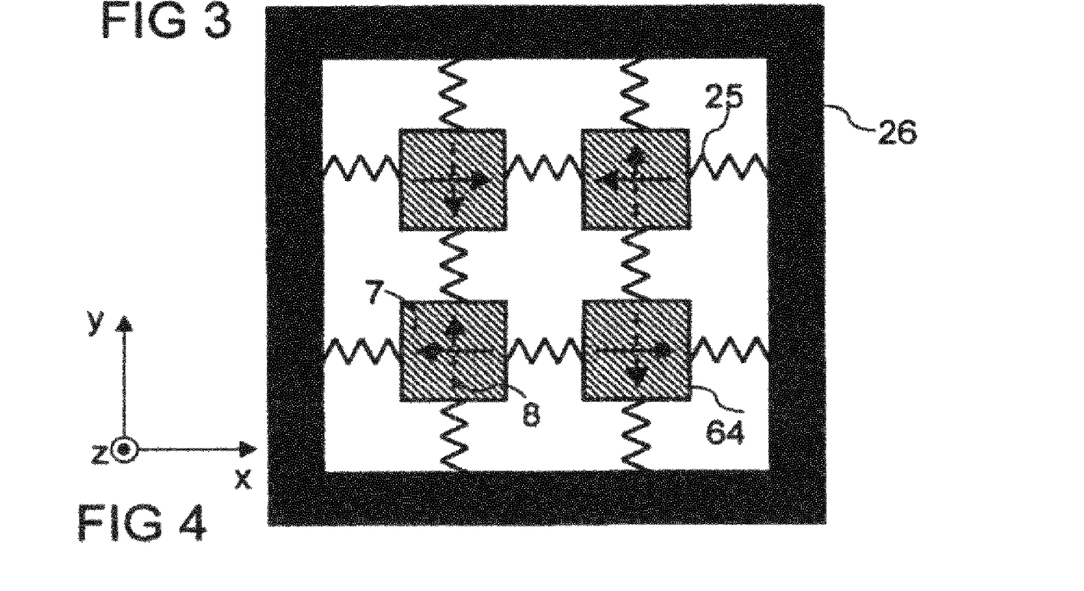
FIG. 4 is a schematic diagram of a fourth embodiment of a closed spring and mass system Coriolis gyro with linear oscillations as the excitation mode and as the detection mode.

FIG. 4 is a schematic diagram of a fourth embodiment of a Coriolis gyro based on a spring and mass system. Four fourth mass elements 64 are coupled to one another and to a substrate 5 (in this case illustrated by an anchor 26) via further xy coupling spring elements 25. Linear oscillations of the fourth mass elements 64 in the x direction are used as the excitation mode 7. Two fourth mass elements 64, which are adjacent in the x direction, move towards one another when the other two fourth mass elements 64 are moving away from one another in the x direction. During rotation of the Coriolis gyro about the sensitive axis Ω, which is at right angles to the x and y directions (and therefore parallel to the z direction), linear oscillation is excited as the detection mode, and shifted with respect to the excitation mode (Lin-Lin). In this case, two fourth mass elements 64, adjacent in the y direction, move towards one another when the two other fourth mass elements 64 are moving away from one another. The xy coupling spring elements 25 are soft in the x and y directions, but are otherwise stiff. In the case of this Coriolis gyro, the useful modes (i.e. the excitation modes 7 and detection modes 8) are closed.

The following FIGS. 5 to 11 illustrate a fourth embodiment based on a first to a seventh variant, in greater detail. The invention is not limited to this fourth embodiment, and one skilled in the art may also envision specific variants for the first to third embodiments based on this description.

The sensitive axis Ω is at right angles to the plane of the drawing in the first to seventh variants. All components shown in light gray represent moving "mass elements" that, to a first approximation, can be regarded as infinitely stiff. Areas shown in dark gray basically cannot move relative to the substrate. Lines represent bending beams used as components of spring elements. Such bending beams are infinitely stiff, to a good approximation, in the longitudinal direction. If the length of a bending beam in the z direction is considerably longer than that in the plane of the drawing at right angles to the longitudinal direction, the bending beam is considerably stiffer in the z direction than in the direction of the axis in the plane of the drawing at right angles to the longitudinal direction. The mass/moment of inertia of the bending beams and of the mass elements, which are part of a spring structure, can frequently, to a good approximation, be ignored. Such approximations are indicated in the following text, by the term "essentially".

A multiplicity of manufacturing methods, particularly microtechnical methods, are suitable. All of the variants can be produced, for example, using the microtechnical manufacturing method described in the German patent application "Method for Production of a Component, and a Component", (not yet published), of identical International filing date and applicant as the present application, or "conventional surface-micromechanical processes" (e.g. those commercially available from Robert Bosch GmbH, Analog Devices).

Figure 5:
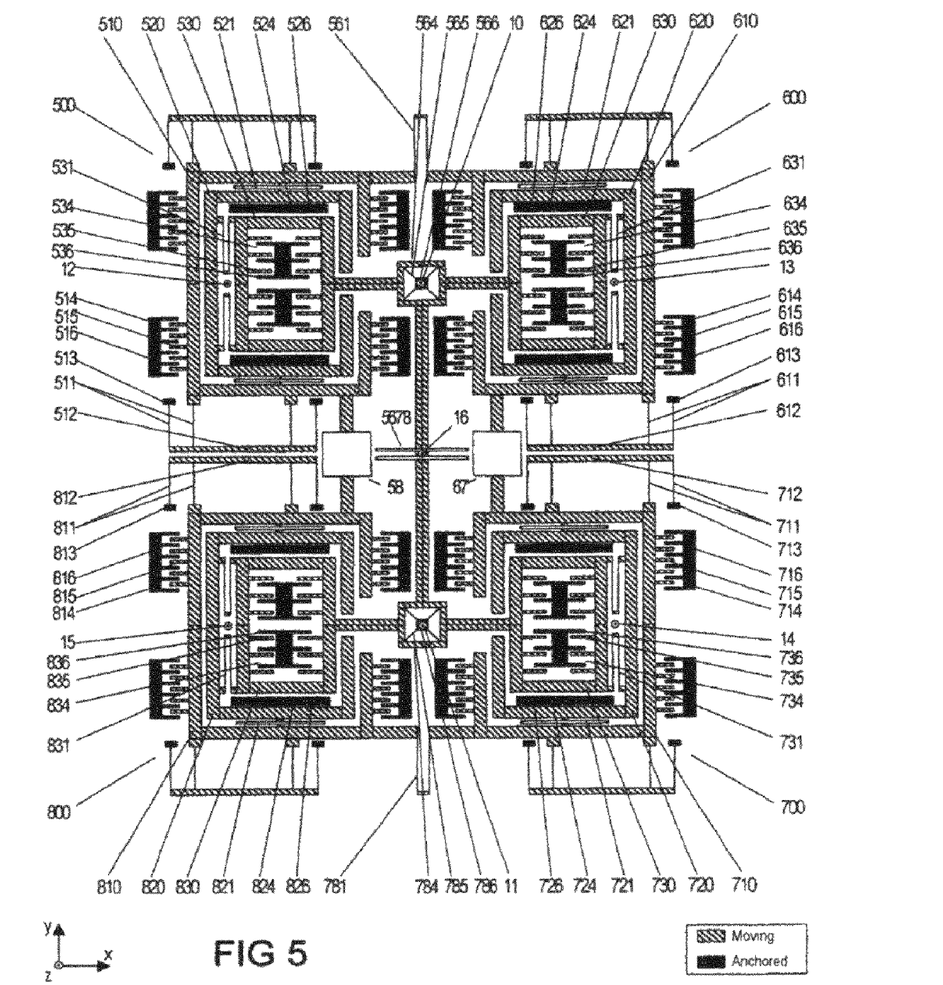
FIG. 5 is a plan view of a first variant of a fifth embodiment of a Coriolis gyro according to the invention.
Figure 6:
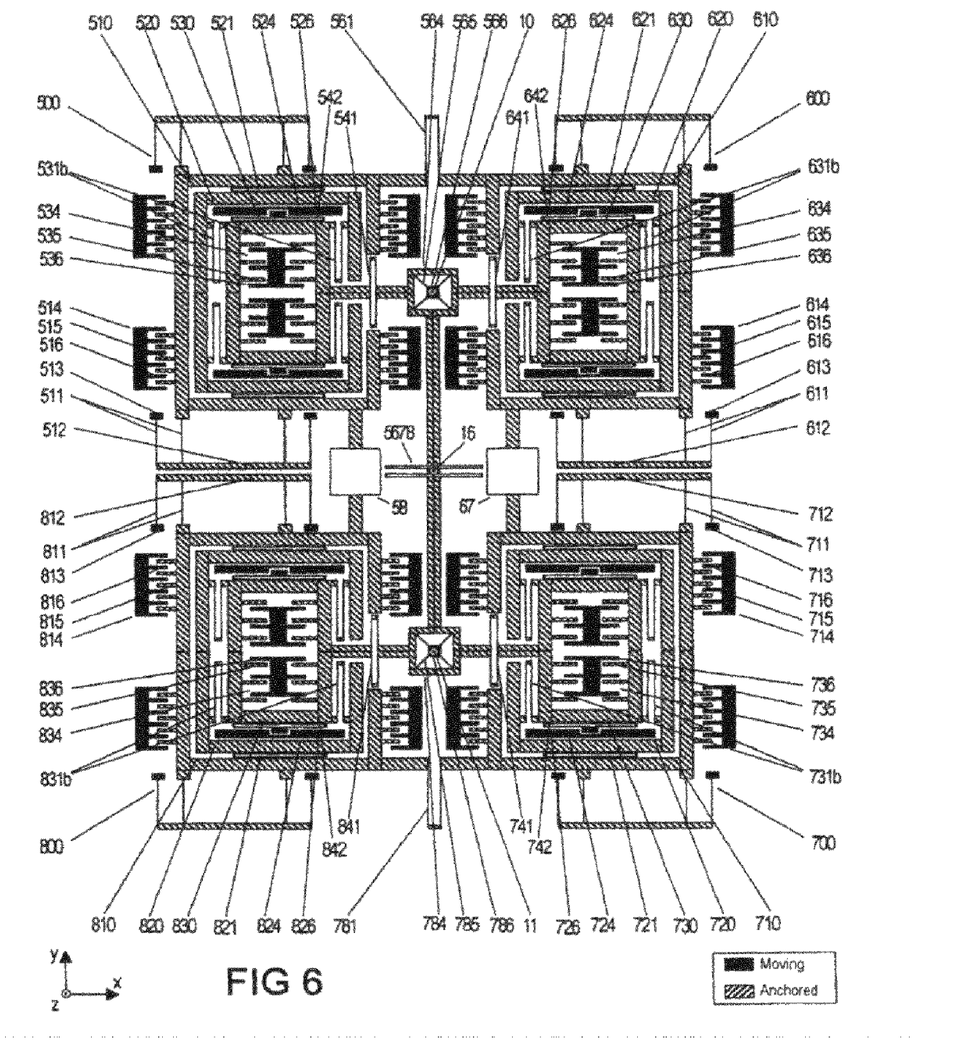
FIG. 6 is a plan view of a second variant of the fifth embodiment of a Coriolis gyro according to the invention.

The first variant shown in FIG. 5 has a substrate (not illustrated) and a first individual structure 500, a second individual structure 600, a third individual structure 700 and a fourth individual structure 800. The first individual structure 500 comprises a first excitation unit 510, attached to the substrate via a first x spring element 511 at a first anchor point 513. A first Coriolis element 520 is connected via a first y spring element 521 to the first excitation unit 510. A first detection unit 530 is connected to the first Coriolis element 520 via a first x rotation spring element 531.

The second, third and fourth individual structures 600, 700 and 800 are constructed in an analogous manner from second, third and fourth excitation units 610, 710, 810, second, third and fourth x spring elements 611, 711, 811, second, third and fourth anchor point 613, 713, 813, second, third and fourth y spring elements 621, 721, 821, second, third and fourth Coriolis elements 620, 720, 820, second, third and fourth x rotation spring elements 631, 731, 831, and second, third and fourth detection units 630, 730, 830 respectively.

The first excitation unit 510 is coupled to the second excitation unit 610 in the same way that the third excitation unit 710 is coupled to the fourth excitation unit 810. That is, in each case, directly by means of first coupling spring elements 561 and 781 respectively. The first and the fourth excitation units 510, 810 as well as the second and third excitation units 610, 710 are each directly coupled by means of second coupling spring elements 58 and 67 respectively. The first and second detection units 530, 630 as well as the third and fourth detection units 730, 830 are directly coupled by means of third coupling spring elements 564 and 784 respectively, forming a first and a second coupled detection unit. The first coupled detection unit 530, 630 is directly coupled to the second coupled detection unit 730, 830 via a fourth coupling spring element 5678.

The x spring elements 511, 611, 711, 811 are soft in the x direction and as stiff as possible in the y and z directions. They are connected to solid elements 512, 612, 712, 812 to improve guidance characteristics. The y spring elements 521, 621, 721, 821 are soft in the y direction and as stiff as possible in the x and z directions. The y spring elements 521, 621, 721, 821 may also be formed as a straight beam, corresponding to the y spring elements 551, 651, 751, 851 of FIG. 11. The x rotation spring elements 531, 631, 731, 831 are designed to be soft in the x direction and, in the event of torsion about their respective axes of symmetry 12, 13, 14, 15 (of two individual spring elements which are arranged one above the other in the figure) in the z direction, and are stiff for all other loads. The x rotation spring elements 531, 631, 731, 831 therefore have the characteristic of a joint which at the same time allows relative rotation and a change in the distance in the x direction between the Coriolis elements 520, 620, 720, 820 and the detection units 530, 630, 730, 830.

The first coupling spring elements 561, 781 are designed to be soft in the x direction, and stiff in the z and y directions. The third coupling spring elements 564, 784, comprising bending beams 565, 785 and an anchor on the substrate 566, 786, are designed to be soft in the event of torsion about their axes of symmetry in the z direction 10, 11, stiff for all other loads, and are therefore also referred to as rotary spring elements.

The second coupling spring elements 58, 67 are designed to be soft in the x and y directions and stiff in the z direction. As in the case of all spring structures, the figures show design examples. For example, instead of the second coupling spring elements 58, 67, it is also possible to use modified coupling springs, corresponding to the springs 141, 241 shown in FIG. 10.

The fourth coupling spring element 5678 is designed to be soft in the y direction and, in the event of torsion about its axis of symmetry, in the z direction 16. It is stiff for all other loads and blocks in-phase rotation of the detection units 530, 630 and 730, 830.

The excitation mode corresponds to two linear, out-of-phase oscillations in the direction of the x axis of the first and second excitation units 510, 610 together with the first and second Coriolis elements 520, 620 and, respectively, the third and fourth excitation units 710, 810 together with the third and fourth Coriolis elements 720, 820. The two out-of-phase oscillations are once again out-of-phase with one another. The resonant frequency of the excitation mode is essentially governed by the mass of the excitation units 510, 610, 710, 810 and of the Coriolis elements 520, 620, 720, 820, as well as the spring stiffnesses of the spring elements 511, 611, 711, 811, of the additional spring elements 531, 631, 731, 831, of the first coupling spring elements 561, 781 and of the second coupling spring elements 58, 67.

The detection mode corresponds to a mixed form of rotary and linear oscillations. They are two rotary oscillations of the first and second detection units 530, 630 about their axis of symmetry 10 in the z direction and of the third and fourth detection units 730, 830 about their axis of symmetry 11 in the z direction. The two rotary oscillations are out-of-phase with respect to one another, while the first and second Coriolis elements 520, 620 and the third and fourth Coriolis elements 720, 820 in this case carry out a "type of rotary oscillation". They are guided in the y direction by the first and second y spring elements 521, 621 and the third and fourth y spring elements 721, 821 relative to the first and second excitation units 510, 610 and, respectively, the third and fourth excitation units 710, 810. They can be rotated by the first and second x rotation spring elements 531, 631 and, respectively, the third and fourth x rotation spring elements 731, 831 with respect to the corresponding first and second detection units 530, 630, and the third and fourth detection units 730, 830, respectively. The resonant frequency of the detection mode is essentially governed by the masses/moments of inertia of the Coriolis elements 520, 620, 720, 820 and of the detection units 530, 630, 730, 830, and the spring stiffnesses of the fourth coupling spring element 5678, the third coupling spring elements 564, 784, the x rotation spring elements 531, 631, 731, 831 and the y spring elements 521, 621, 721, 821.

The first to fourth individual structures 500, 600, 700, 800 have a first to fourth force transmitter 514, 614, 714, 814 respectively to excite the excitation mode. These force transmitters 514, 614, 714, 814 are also designed as a tap for the excitation oscillation. Additional taps can be provided. In the illustrated example, so-called comb drives are shown as force transmitters 514, 614, 714, 814.

The expressions "comb drive" and "plate capacitor arrangement" that are used should be understood as follows:
- A "comb drive" is an arrangement of capacitors in the form of plates with "dipping" electrodes, i.e., the overlap of the electrodes changes. The same electrode separations are generally chosen on both sides of a dipping electrode.
- A "plate capacitor arrangement" is an arrangement of capacitors in the form of plates, in which electrode separation is varied during a movement. Possible implementations are, on the one hand, a different electrode separation on both sides of one moving electrode (when the aim is to mistune only the frequency, an identical electrode separation may also be chosen) and, on the other hand, stationary electrodes on both sides of a moving electrode, each at a different potential.

The comb drives illustrated in FIG. 5 comprise moving electrodes 515, 615, 715, 815 integrated in the excitation units 510, 610, 710, 810, and electrodes 516, 616, 716, 816, anchored on the substrate. At the same time, comb drives can be used as force transmitters and as taps.

The first to fourth individual structures 500, 600, 700, 800 have a first to fourth tap 534, 634, 734, 834 respectively to detect the detection oscillation. The taps are also designed either as force transmitters to compensate for Coriolis force, for the reset mode, or, if required, force transmitters can additionally be provided. In the illustrated example, plate capacitor arrangements are shown as taps, with plate separation changing during the detection movement. The taps each comprise first to fourth moving electrodes 535, 635, 735, 835, integrated in the respective detection units 530, 630, 730, 830, and first to fourth electrodes 536, 636, 736, 836, anchored on the substrate. Plate capacitor arrangements can be used at the same time as force transmitters and as taps.

It should be emphasized that comb drives can also be used as taps (and/or as force transmitters) for detection oscillation, as the detection units do not carry out the excitation movement. Plate capacitor arrangements with a difference in plate separation as a tap for detection oscillation are characterized in that the applied electrical voltage changes the resonant frequency of the detection mode. On the one hand, this can be intentionally employed to set the frequency (to double resonance). On the other hand, for example, the resonant frequency is modulated by modulation signals for the tap function or by (rotation-rate-dependent) reset voltages. Comb drives do not have this disadvantage. When using comb drives, plate capacitor arrangements can additionally be integrated, with a change in plate separation, to make it possible to carry out the frequency adjustment described above.

It should also be noted that further force transmitters, taps and/or apparatus for frequency tuning 524, 624, 724, 824 can also be provided for the Coriolis elements. The illustrated example relates to plate capacitor arrangements in which plate separation is changed. The arrangements comprise moving electrodes integrated in the Coriolis elements 520, 620, 720, 820, and electrodes 526, 626, 726, 826 anchored on the substrate (only one electrode is illustrated in each case).

The structure of the first variant has modes with resonant frequencies in the vicinity of the useful modes. These can be excited by linear accelerations in the x direction and rotary accelerations about the z axis. In this case, the excitation units 510, 610, 710, 810 and the Coriolis elements 520, 620, 720, 820 are moved in the x direction. The resultant acceleration and vibration-dependent errors are small in comparison to a parasitic mode, in which the detection units are moved in the y direction.

In the first variant, two detection units carry out a rotary oscillation together. This means that, in the illustrated example with taps 534, 634, 734, 834 with stationary electrodes 536, 636, 736, 836, the change in plate separation of the plate capacitor arrangements is position-dependent. This results in additional complexity of design and linearization. Such additional complexity does not exist when, for example, the abovementioned comb drives are used as taps/force transmitters and frequency adjustment is carried out by means of the apparatus 524, 624, 724, 824.

Linear oscillation of the detection units can also be provided (see FIG. 6 for the second variant of the fourth exemplary embodiment) by additional springs 541, 641, 741, 841. Such springs are soft in the x direction and during rotation about their axis of symmetry in the z direction. They are otherwise as stiff as possible. Additional anchoring of the detection units 530, 630, 730, 830 on the substrate is provided by spring elements 542, 642, 742, 842 Which are soft in the y direction, but otherwise as stiff as possible. The spring elements 531b, 631b, 731b, 831b that connect the detection units 530, 630, 730, 830 to the Coriolis elements 520, 620, 720, 820 can be two-ended as they do not require any "joint characteristic".

Figure 7:
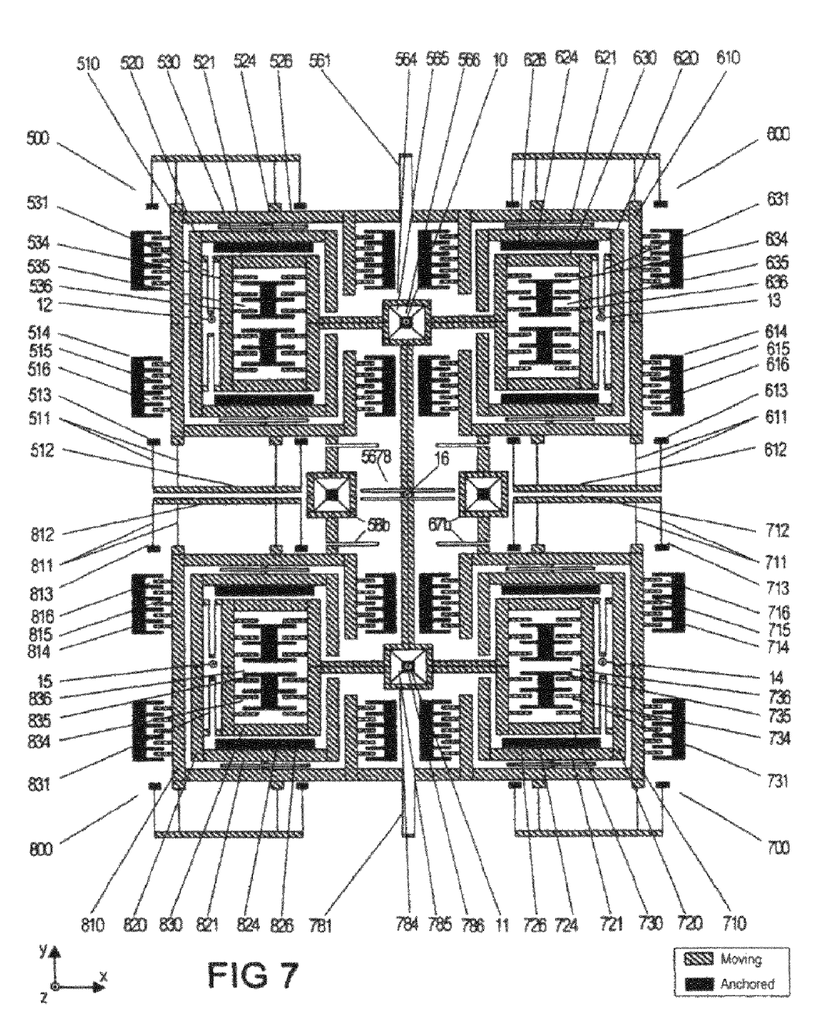
FIG. 7 is a plan view of a third variant of the fifth embodiment of a Coriolis gyro according to the invention.

The third variant, illustrated in FIG. 7, generally corresponds to the first variant, with the following exception:
- The spring elements 58b, 67b which connect the first and fourth excitation units 510, 810 and the second and third excitation units 610, 710 are modified so that linear accelerations in the x direction approximately do not result in any deflection of the excitation units 510, 610, 710, 810 and of the Coriolis elements 520, 620, 720, 820 in the x direction.

The structure has modes in the third variant, with resonant frequencies in the vicinity of the useful modes. They can be excited by rotary accelerations about the z axis. In this case, the excitation units 510, 610, 710, 810 and the Coriolis elements 520, 620, 720, 820 move in the x direction. The resultant acceleration and vibration-dependent errors are small in comparison to a parasitic mode, in which the detection units are moved in the y direction.

Figure 8:
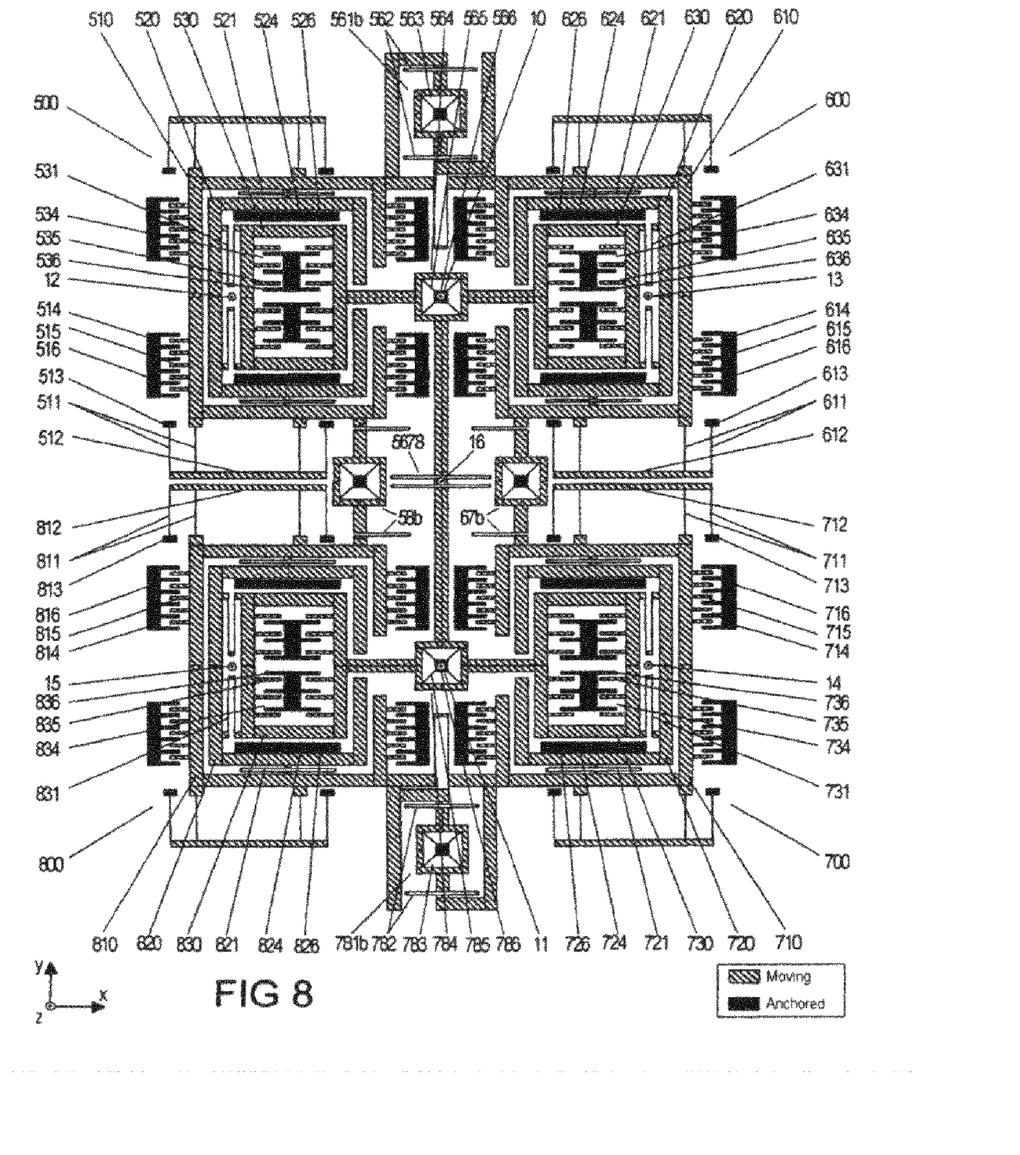
FIG. 8 is a plan view of a fourth variant of the fifth embodiment of a Coriolis gyro according to the invention.

The fourth variant, shown in FIG. 8, generally corresponds to the third variant with the following change:
- The spring elements 561b, 781b that couple the first and second excitation units 510, 610 and the third and fourth excitation units 710, 810 are modified so that rotary accelerations about the z axis cause approximately no deflection of the excitation units 510, 610, 710, 810 and the Coriolis elements 520, 620, 720, 820 in the x direction. The modified spring elements 561b, 781b in such case comprise y rotation spring elements 562, 782 which are soft for rotation about their axis of symmetry (the z direction) and when deflected in the y direction, and are otherwise as stiff as possible. Rotary springs 563, 783 are designed in a manner corresponding to the rotary springs 564, 784.

Figure 9:
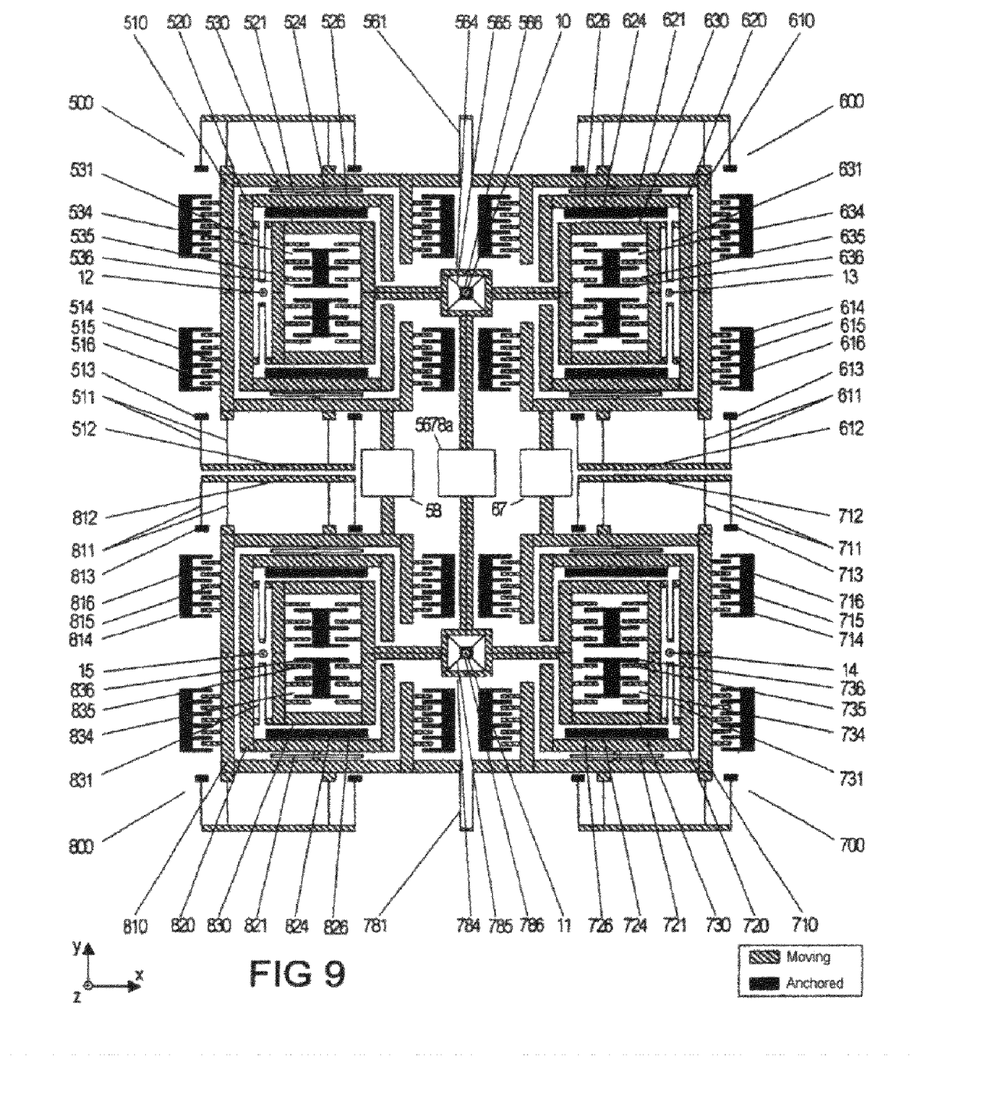
FIG. 9 is a plan view of a fifth variant of the fifth embodiment of a Coriolis gyro according to the invention.

FIG. 9 illustrates a fifth variant that generally corresponds to the first variant. The spring 5678a does not block in-phase rotation of the detection units 530, 630 and 730, 830 but only creates frequency splitting between the common and differential modes. The resonant frequencies of the useful modes are not considerably below the resonant frequencies of the modes that can be excited by accelerations and/or vibration and cause a significant error signal.

Figure 10:
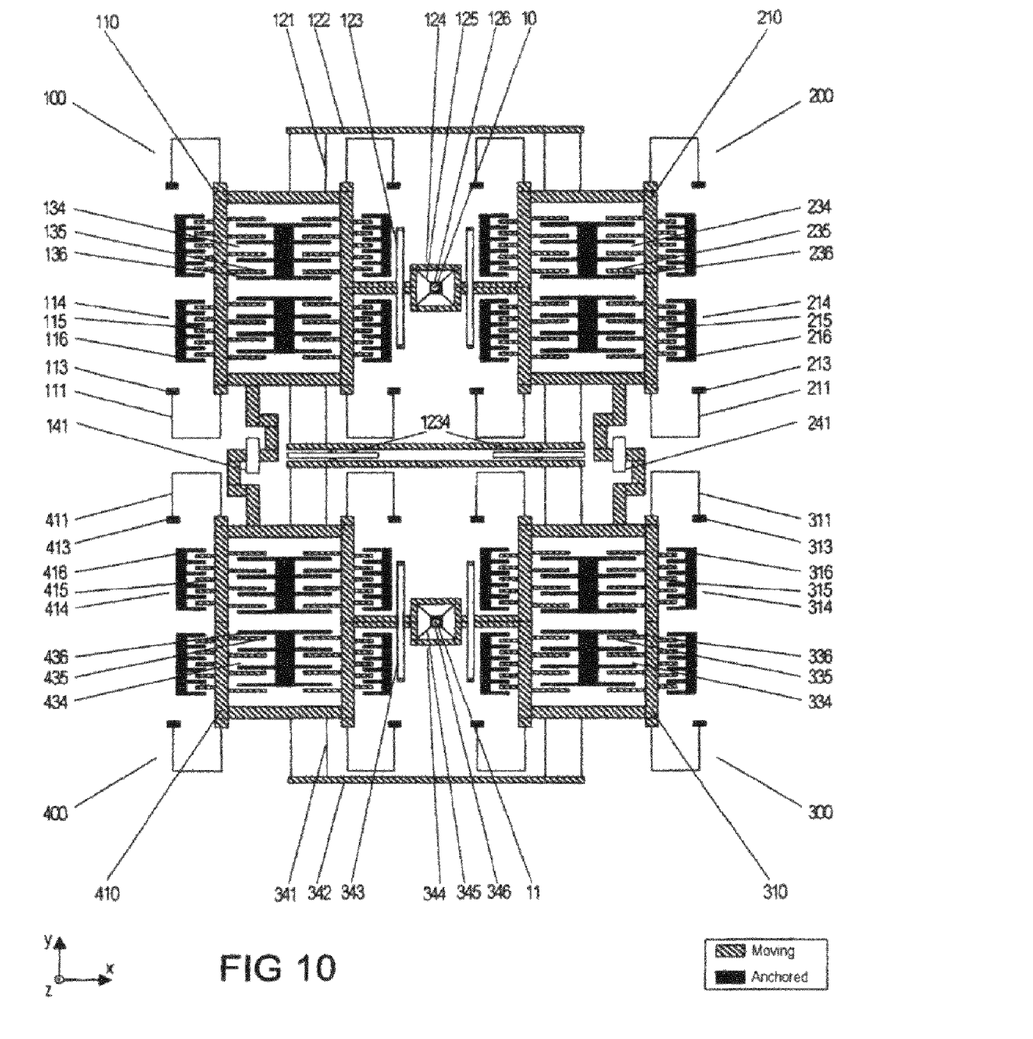
FIG. 10 is a plan view of a sixth variant of the fifth embodiment of a Coriolis gyro according to the invention.

FIG. 10 illustrates a sixth variant. In this case, the first to fourth individual structures 100, 200, 300, 400 respectively comprise a simple first to fourth oscillation structure 110, 210, 310, 410. Coupling of the oscillation structures 110, 210, 310, 410 for production of the closed excitation and detection modes is provided by xy spring elements 141, 241 which are soft on the xy plane, but are otherwise as stiff as possible. In addition, the detection mode can be coupled by the y rotation spring 1234. The illustrated simple coupling means that modes exist with resonant frequencies below the useful modes. Otherwise, the sixth variant corresponds to the first variant. The detection mode may be regarded as two out-of-phase rotary oscillations.

Figure 11:
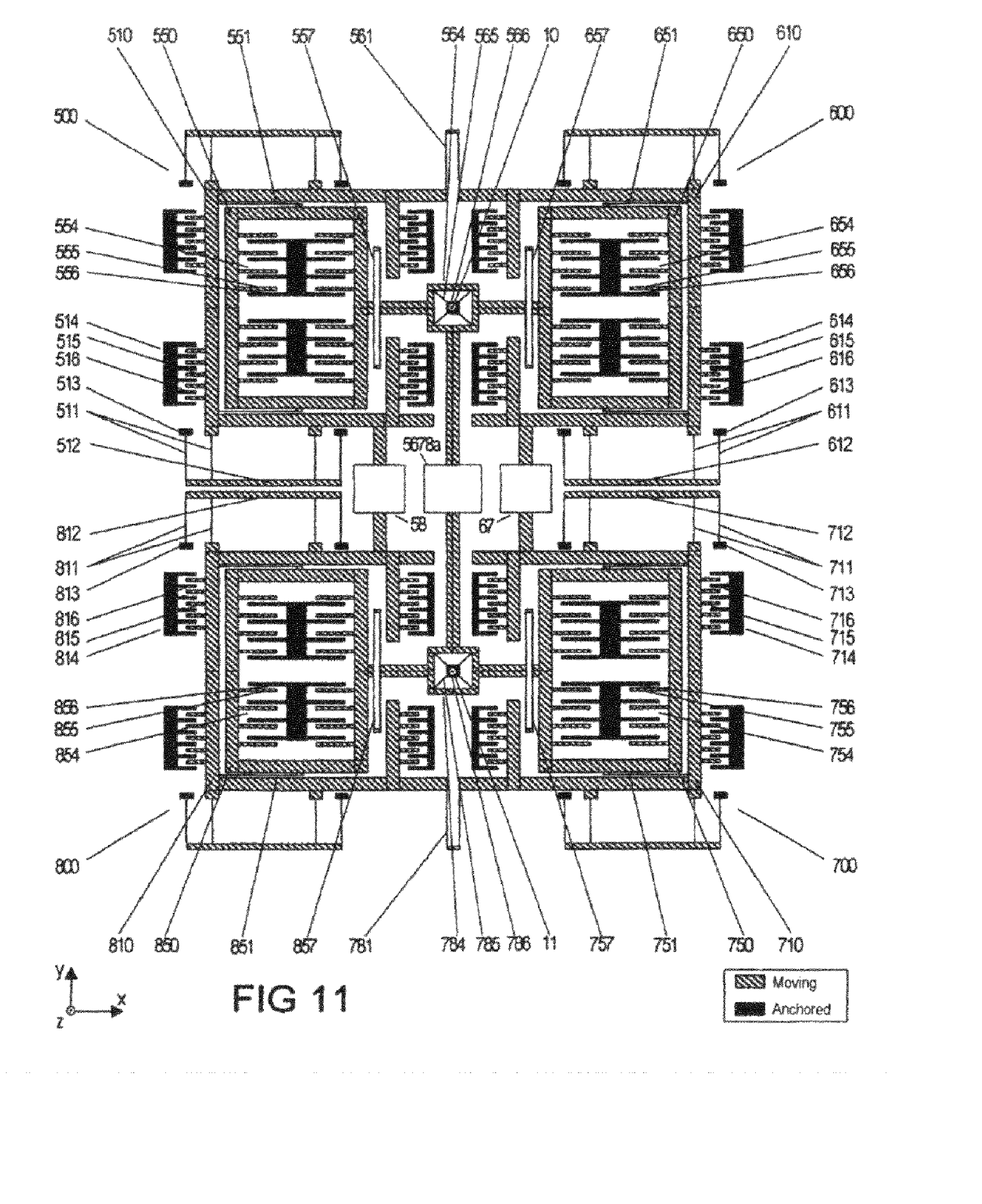
FIG. 11 is a plan view of a seventh variant of the fifth embodiment of a Coriolis gyro according to the invention.

FIG. 11 illustrates a seventh variant. In this case, the first to fourth individual structures 500, 600, 700, 800 comprise a simply decoupled structure composed of first to fourth excitation units 510, 610, 710, 810 and first to fourth sample masses 550, 650, 750, 850 respectively. Coupling to the closed excitation mode is provided by xy spring elements 58, 67, which are soft in the x and y directions but are otherwise as stiff as possible. The closed detection mode is provided by an xy rotation spring 5678a, which is soft in the x and y directions and, in the event of torsion about its axis of symmetry in the z direction, but is otherwise as stiff as possible. The illustrated simple coupling means that modes exist with resonant frequencies below the useful modes. Otherwise, the seventh variant corresponds to the first variant. The detection mode may be regarded as mixed.

The invention provides improved rotation rate sensors based on spring and mass systems. Structures of this class are disclosed in which both useful modes (excitation mode and detection mode) are closed. The useful modes cannot be excited by accelerations and vibration, and there is no error signal. To be precise, this is true only when no manufacturing tolerances have to be taken into account. The Coriolis gyro of the invention comprises a substrate and a multiplicity of individual structures (at least two) and spring elements. Some of the individual structures are connected to the substrate, and others are connected to one another, via the spring elements. As a result, the arrangement has at least two closed eigen modes, one of which can be used as the excitation mode and the second as the detection mode. The excitation mode can be excited by force transmitters. If the Coriolis gyro is rotated about its sensitive axis, excitation oscillation results in Coriolis forces that excite the detection mode. Movement of the detection mode can be measured by taps. The amplitude of the resultant oscillation can be used as a measurement variable.

According to an advantageous refinement of the invention, the Coriolis force can be reset by force transmitters. This leads to better evaluation because of the lack of deflection of the individual structures. Force transmitters are required for this purpose, by means of which moments and forces can be applied to the detection mode. The amplitude of the resetting moment or the resetting force is then a measure of the angular velocity. Movement of the excitation mode can be checked in a simple manner by taps.

Actuating elements for quadrature compensation and/or actuating elements for frequency adjustment are advantageously provided and can be designed such that they can be set or controlled. Quadrature compensation and frequency adjustment are advantageous for high-precision Coriolis gyros manufactured microtechnically. Although both can also be achieved by laser trimming, a process such as this is expensive. Actuating elements have the advantage that the adjustment process itself costs very little.

An advantageous refinement discloses structures in which the resonant frequencies of the useful modes may be considerably below those of the modes that can be excited by accelerations and/or vibrations and cause a significant error signal. Vibration-dependent errors are therefore further reduced. These structures have the advantages of the "shape and bending oscillations" class and of the "spring and mass systems" class, and therefore avoid their respective disadvantages.

The following describes two situations, which will be used to quantify the advantages:

1st Situation (Advantage of a Closed Detection Mode):
The detection mode is excited by a linear vibration or acoustically at the precise frequency at which the excitation mode is operated (in general the resonant frequency of the excitation mode and, with tuned resonant frequencies, also that of the detection mode). The amplitude of the acceleration acting is $a_0$. This is indicated in the following by the unit "g". For simplicity, it is assumed that the phases of the disturbance and the Coriolis forces are identical.

1st variant: the detection mode is "simple" (not out-of-phase) linear oscillation. Acceleration can not then be distinguished from a Coriolis acceleration, and produces an error signal $\Omega_v$. With a resonant frequency of $f_0 = \omega_0/(2\pi) = 10$ kHz and an amplitude of the excitation mode of 10 μm, this produces:

$$\Omega_{v1} = \frac{a_0}{2\omega_0 x_0} \approx 450°/s \text{ (for } \alpha_0 = 1 \text{ g)}$$

2nd variant: the detection mode is a simple rotary oscillation. The mass unbalance is $k_2 = 1\%$. The error signal then corresponds approximately to:

$$\approx k_2 \frac{a_0}{2\omega_0 x_0} \approx 4.5°/s \text{ (for } \alpha_0 = 1 \text{ g)}$$

3rd variant: the detection mode corresponds to the differential mode of two coupled rotary oscillations (closed mode). In similar conditions to those for variant 2, it can be assumed that the mass unbalance is approximately 100 times less ($k_3$=100 ppm). The error signal then corresponds approximately to:

$$\approx k_3 \frac{a_0}{2\omega_0 x_0} \approx 0.045°/s \text{ (for } \alpha_0 = 1 \text{ g)}$$

2nd Situation (Advantage of the Subject Matter as claimed):
Rotary acceleration components in the vibration are considered at frequencies considerably below the resonant frequencies discussed in the following text.

Variant 1: the detection mode corresponds to two out-of-phase rotary oscillations. The resonant frequency $\omega_{g|1}$ of the common mode of the two coupled rotary oscillations is less than the resonant frequency $\omega_2$ of the differential mode of the two coupled rotary oscillations (i.e., of the detection mode), for example $$\frac{\omega_{g|1}}{\omega_2} = \frac{1}{2}$$

Variant 2: the detection mode corresponds to two out-of-phase rotary oscillations. The resonant frequency $\omega_{g|2}$ of the common mode of the two coupled rotary oscillations is greater than the resonant frequency $\omega_2$ of the differential mode of the two coupled rotary oscillations (i.e., of the detection mode), for example $$\frac{\omega_{g|2}}{\omega_2} = \frac{1,5}{1}$$

With the described excitation, the ratio of the resultant deflections of the common modes of the variant 1 and variant 2 is:

$$\frac{x_{g/1}}{x_{g/2}} \approx \frac{\omega_{g/2}^2}{\omega_{g/1}^2} \approx 9$$

Since errors caused by excitation of the common mode are proportional to the deflection of the common mode or to the square of the deflection, the errors in variant 2 are reduced by the factor 9 to 81.

The structures according to an advantageous refinement of the invention are designed such that the resonant frequencies of the useful modes are considerably below the resonant frequencies of all other modes, and errors in the excitation of these modes are reduced.

Examples result from two coupled out-of-phase linear oscillations. Such oscillations are once again out-of-phase with respect to one another, as a closed excitation mode and from two coupled out-of-phase rotary oscillations as a closed detection mode (Lin-Rot), and, from two coupled out-of-phase rotary oscillations as a closed excitation mode and from two coupled out-of-phase rotary oscillations as a closed detection mode (Rot-Rot). Other examples have three closed eigen modes, one eigen mode of which, for example, can be used as an excitation mode, and the two other eigen modes as detection modes for rotations about different sensitive axes.

In a preferred refinement the Coriolis gyro can be produced in a simple manner with oscillations parallel to the substrate surface, since no movements need be detected or produced at right angles to the substrate surface.

According to another advantageous refinement, individual structures are in the form of decoupled structures comprising an excitation unit and a sample mass. This results in the following advantages:
1. The excitation unit is guided approximately ideally. Any error angle between the drive for the excitation unit and the excitation mode leads to approximately no excitation of the detection mode, and therefore to no error signal.
2. Deflection of the detection mode leads to approximately no change in the drive force exerted on the excitation unit.
3. In summary, undesirable interactions between the excitation force on the excitation unit and movement of the detection mode are largely suppressed.

In the invention double-decoupled structures comprising an excitation unit, a Coriolis element and a detection unit are provided. This additionally leads to "pick-off decoupling", i.e., any error angle between the tap of the detection unit and the movement of the excitation unit leads to approximately no error signal.

Four individual structures are provided by the invention, by means of which the closed useful modes can be produced in a simple manner.

While this invention has been described with reference to its presently preferred embodiment, it is not limited thereto. Rather, the invention is limited only insofar as it is defined by the following set of patent claims and includes within its scope all equivalents thereof.

What is claimed is:

1. A Coriolis gyro having an arrangement which comprises a substrate, at least four individual structures and spring elements, wherein the spring elements couple the individual structures to the substrate and to one another, having force transmitters and having taps, wherein the arrangement has at least one excitation mode which can be excited by the force transmitters and at least one detection mode which can be measured by the taps, wherein the detection mode can be excited, in the excited excitation mode, on the basis of a Coriolis force when the Coriolis gyro is rotated about a sensitive axis, wherein the excitation mode comprises two antiphase-coupled linear oscillations, which are once again in antiphase, of in each case two of the individual structures;
characterized in that
the detection mode comprises either two rotary oscillations of a first and a second detection unit about their axis of symmetry parallel to the sensitive axis and of a third and a fourth detection unit about their axis of symmetry parallel to the sensitive axis, where the two rotary oscillations are coupled and in antiphase with respect to one another;
or
an antiphase linear oscillation of a first and a second detection unit and an antiphase linear oscillation of a third and a fourth detection unit, each of them derived from a rotary oscillation parallel to the sensitive axis via an additional spring element, wherein both rotary oscillations are coupled and in antiphase and both antiphase linear oscillations are in antiphase with respect to one another, wherein between the first and second detection units and between the third and fourth detection unit a rotary spring element is provided, respectively,
each rotary spring element comprises bending beams and an anchor on the substrate and is designed to be soft in the event of torsion about the axis of symmetry of the respective rotary spring element parallel to the sensitive axis and stiff for all other loads, and with the excitation mode and the detection mode being closed eigenmodes of the arrangement, by means of which theoretically, that is to say if manufactured optimally without any manufacturing tolerances, no forces or moments can be exerted on a surrounding area of the Coriolis gyro.

2. The Coriolis gyro as claimed in claim 1,
characterized in that
force transmitters are provided in order to reset the Coriolis force.

3. The Coriolis gyro as claimed in claim 1,
characterized in that
taps are provided in order to measure the movement of the excitation mode.

4. The Coriolis gyro as claimed in claim 1,
characterized by
actuating elements for quadrature compensation.

5. The Coriolis gyro as claimed in claim 1,
characterized by
actuating elements for frequency adjustment.

6. The Coriolis gyro as claimed in claim 1,
characterized in that
resonant frequencies of the excitation mode and the detection mode are considerably below the resonant frequencies of the modes which can be excited by accelerations and/or vibration and cause a significant error signal.

7. The Coriolis gyro as claimed in claim 1,
characterized in that
resonant frequencies of the excitation mode and the detection mode are considerably below the resonant frequencies of all other eigenmodes of the arrangements.

8. The Coriolis gyro as claimed in claim 1,
characterized in that
directions of the linear oscillations of the excitation mode and of the detection mode are parallel to a surface of the substrate, and
the axes of the rotary oscillations are at right angles to the substrate surface.

9. The Coriolis gyro as claimed in claim 1,
characterized in that
the individual structures are each formed from an excitation unit, and a detection unit,
and are thus decoupled.

10. The Corilis gyro as claimed in claim 1,
characterized in that
the individual structures are each formed from an excitation unit, a Coriolis element and a detection unit, and are thus double-decoupled.

11. The Coriolis gyro as claimed in claim 8,
characterized in that
the individual structures are each formed from an excitation unit, a Coriolis element and a detection unit, and are thus double-decoupled, and in that an x rotation spring element is in each case provided between the Coriolis elements and the respective detection units and allows a relative rotation and a distance change in the direction of the linear oscillations of the excitation mode.

12. The Coriolis gyro as claimed in claim 8,
characterized in that
the individual structures are each formed from an excitation unit, a Coriolis element and a detection unit, and are thus double-decoupled, and in that an x rotation spring is provided between in each case one of the two detection units and the respective rotary spring element, and in that the detection units are anchored on the substrate via spring elements.

* * * * *